(12) United States Patent
Harding et al.

(10) Patent No.: US 8,457,992 B1
(45) Date of Patent: Jun. 4, 2013

(54) SYSTEM, METHOD AND COMPUTER PROGRAM PRODUCT FOR DETERMINING COMPLIANCE WITH CONTRACTED PHARMACY REIMBURSEMENT RATES

(75) Inventors: Lari Harding, Clemmons, NC (US); Scott Renegar, Clemmons, NC (US); Angela Murray, Winston-Salem, NC (US); Andrew F. Robbins, Winston-Salem, NC (US)

(73) Assignee: Inmar, Inc., Winston-Salem, NC (US)

( * ) Notice: Subject to any disclaimer, the term of this patent is extended or adjusted under 35 U.S.C. 154(b) by 59 days.

(21) Appl. No.: 12/899,179

(22) Filed: Oct. 6, 2010

Related U.S. Application Data

(60) Provisional application No. 61/323,852, filed on Apr. 13, 2010.

(51) Int. Cl.
*G06Q 40/00* (2012.01)
(52) U.S. Cl.
USPC .................................................. 705/4; 705/35
(58) Field of Classification Search
CPC ..................................................... G06Q 40/00
USPC ........................................................ 705/4, 35
See application file for complete search history.

(56) References Cited

U.S. PATENT DOCUMENTS

| | | | | |
|---|---|---|---|---|
| 5,550,734 A | * | 8/1996 | Tarter et al. | 705/2 |
| 5,704,044 A | * | 12/1997 | Tarter et al. | 705/4 |
| 5,890,129 A | * | 3/1999 | Spurgeon | 705/4 |
| 6,012,035 A | * | 1/2000 | Freeman et al. | 705/2 |
| 6,112,183 A | * | 8/2000 | Swanson et al. | 705/2 |
| 6,529,876 B1 | * | 3/2003 | Dart et al. | 705/4 |
| 7,016,856 B1 | * | 3/2006 | Wiggins | 705/2 |
| 7,346,522 B1 | * | 3/2008 | Baylor et al. | 705/3 |
| 7,685,006 B2 | * | 3/2010 | Rahn et al. | 705/3 |
| 7,904,317 B1 | * | 3/2011 | Lesswing et al. | 705/4 |
| 7,925,519 B2 | * | 4/2011 | Greene | 705/2 |
| 7,926,709 B1 | * | 4/2011 | Dooley et al. | 235/378 |
| 8,019,627 B2 | * | 9/2011 | Baylor et al. | 705/3 |
| 8,160,905 B2 | * | 4/2012 | Lesswing et al. | 705/4 |
| 8,195,482 B2 | * | 6/2012 | Darling et al. | 705/2 |
| 8,321,283 B2 | * | 11/2012 | Rowe et al. | 705/20 |

(Continued)

OTHER PUBLICATIONS

Shilad Solutions, http://www.shiladsolutions.com/overview/html, date unknown but believed to be at least as early as Oct. 6, 2010.

(Continued)

*Primary Examiner* — Narayanswamy Subramanian
(74) *Attorney, Agent, or Firm* — Womble Carlyle Sandridge & Rice LLP

(57) ABSTRACT

A computer-based system, method and computer program product for determining compliance with contracted pharmacy reimbursement rates. The computer-based system, method and computer program product includes storing pharmacy reimbursement contract information comprised of information regarding a plurality of contracts between a payor and a pharmaceutical product provider. A plurality of claims are received via an electronic communications network. One or more of the plurality of received claims are compared to at least one of the plurality of contracts by identifying, via computer processor, one or more of the plurality of contracts having pharmaceutical reimbursement contract information that is common with one or more of the received claims. If only one contract is identified, the one contract is associated with the received claims. An indication of the association of the one identified contract with one or more of the received claims is stored in a computer memory.

16 Claims, 10 Drawing Sheets

U.S. PATENT DOCUMENTS

| | | | | |
|---|---|---|---|---|
| 2001/0039532 | A1* | 11/2001 | Coleman et al. | 705/39 |
| 2004/0024683 | A1* | 2/2004 | Morciniec et al. | 705/37 |
| 2004/0034607 | A1* | 2/2004 | Piccinelli | 705/80 |
| 2004/0054685 | A1* | 3/2004 | Rahn et al. | 707/102 |
| 2004/0085355 | A1* | 5/2004 | Harmes et al. | 345/751 |
| 2005/0108067 | A1* | 5/2005 | Chapman et al. | 705/4 |
| 2005/0261944 | A1* | 11/2005 | Rosenberger | 705/4 |
| 2006/0074712 | A1* | 4/2006 | Jorgensen et al. | 705/2 |
| 2008/0033751 | A1* | 2/2008 | Greene | 705/2 |
| 2009/0313039 | A1* | 12/2009 | Cedergreen | 705/2 |
| 2010/0057640 | A1* | 3/2010 | Cannata | 705/400 |
| 2010/0145724 | A1* | 6/2010 | Kalies, Jr. | 705/2 |
| 2010/0235197 | A1* | 9/2010 | Dang | 705/3 |
| 2011/0258004 | A1* | 10/2011 | Dean et al. | 705/4 |
| 2012/0185263 | A1* | 7/2012 | Emert | 705/2 |

OTHER PUBLICATIONS

PDX, Inc., PDX Pharmacy System, https://www.pdxinc.com/software/pdxpharmacy.asp, date unknown but believed to be at least as early as Oct. 6, 2010.

First Data Bank, Inc., First Data Bank White Paper Determining Drug Product Status, Dec. 2007, pp. 1-15.

Allison Dabbs Garrett and Robert Garis, Leveling the Playing Field in the Pharmacy Benefit Management Industry, Valparaiso University Law Review, 2007-2008, pp. 33-80, vol. 42.

* cited by examiner

US 8,457,992 B1

SYSTEM, METHOD AND COMPUTER PROGRAM PRODUCT FOR DETERMINING COMPLIANCE WITH CONTRACTED PHARMACY REIMBURSEMENT RATES

CROSS REFERENCE TO RELATED APPLICATION

This application claims the benefit of U.S. Provisional Patent Application No. 61/323,852, filed Apr. 13, 2010, the entirety of which is herein incorporated by reference.

FIELD OF THE INVENTION

The present invention generally relates to a computer-based system, method and computer program product for determining compliance with contracted pharmacy reimbursement rates.

BACKGROUND OF THE INVENTION

Distributing pharmaceutical products is a complex process involving pharmaceutical product providers, e.g., pharmacies, pharmaceutical drug manufacturers, health insurance plans, pharmacy benefit managers ("PBMs"), and several federal and state governmental agencies. In many instances, PBM's administer pharmacy plans on behalf of insurance plans and/or insurance carriers, negotiate wholesale drug prices for those same plans, and in some cases, negotiate prices to be paid by pharmacies for pharmaceutical products. Pharmaceutical product manufacturers may give price discounts that are taken into account when reconciling payments among and between insurers, PBM's and pharmacies. Government agencies may receive discounts from the manufacturers, while also regulating the reimbursement rates they may pay to a pharmacy.

Pharmacies may file hundreds of thousands of claims with one or more PBMs or insurance carriers for drugs they dispense to a consumer. These claims seek reimbursement at an agreed upon rate for dispensing a drug to a consumer and for accepting a co-pay less than the full price for that drug from the consumer. The administrative burden in filing and adjudicating claims, given the complex interactions discussed above, is substantial. Because of the high volume of claims filed in a given month or year, ensuring that the claims are adjudicated in accordance with the reimbursement contract is not a routine business practice. Unless the claim is adjudicated consistent with the contract rate, the pharmacy may not receive the full monetary benefit of distributing a pharmaceutical to the consumer.

Accordingly there is a need to simplify the process of comparing pharmaceutical contract information to claims.

DETAILED DESCRIPTION OF PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

Figure 1:
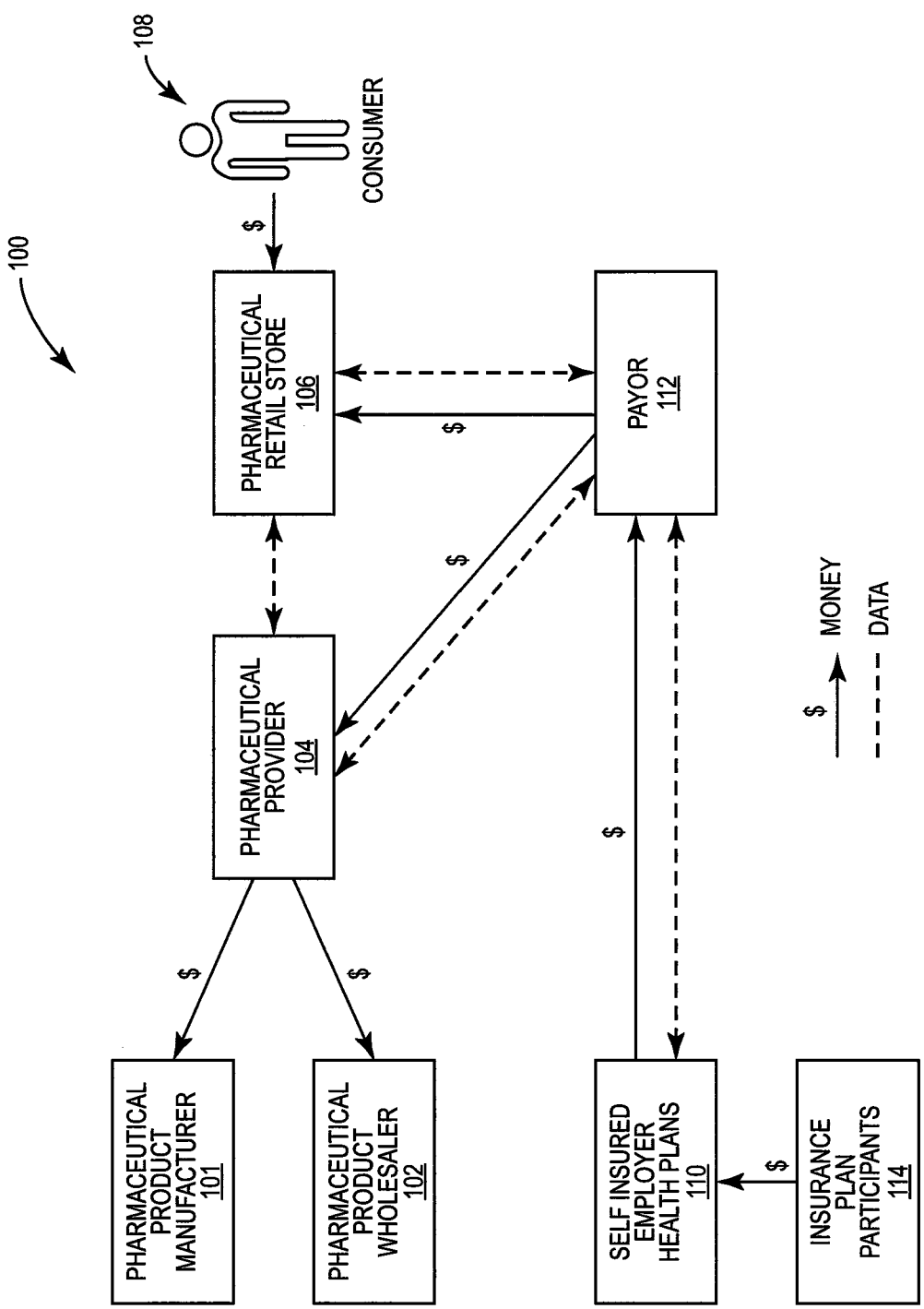
FIG. 1 is a diagram of a process for the adjudication and payment of claims for pharmaceutical products according to an exemplary embodiment of the present invention.

FIG. 1 is a diagram of an exemplary process 100 for adjudicating and paying pharmaceutical product claims. As can be seen in FIG. 1, a pharmaceutical manufacturer 101 and/or a pharmaceutical wholesaler 102 distribute pharmaceutical products to a pharmaceutical product provider 104 in exchange for payments for the pharmaceutical products. The pharmaceutical product provider 104 may in turn distribute the pharmaceutical products to one or more pharmacy retail stores 106. A pharmaceutical product provider 104 may be an entity that includes multiple pharmacy retail stores or a single pharmacy retail store.

Continuing with FIG. 1, to obtain a pharmaceutical product, a consumer 108 provides a prescription and insurance information to the pharmacy 106. The pharmacy 106 may verify with a payor 112 that the consumer has insurance coverage for the particular pharmaceutical product and the amount of the insurance coverage. A consumer 108 may pay the retail store 106 a "co-pay" in exchange for the pharmaceutical products. The co-pay to be paid by the consumer 108, and in some cases the type of pharmaceutical product received, may be determined according to the consumer's health insurance plan 110.

Continuing with FIG. 1, the retail store 106 may file one or more claims for the pharmaceutical product distributed to consumer 108 with a payor 112. The claims, also referred to herein as "pharmaceutical product claims," are adjudicated by the payor 112. The payor 112 may initiate payments to the pharmaceutical product provider 104 or retail store 106 for the product dispensed to the consumer 108. A "payor" as used herein may refer to a pharmacy benefit manager (PBM), who receives and adjudicates claims from the pharmaceutical product provider 104 or 106 on behalf of a health insurance plan 110. The payor 112 may also include a health insurance plan that administers a pharmaceutical benefit plan.

A PBM may negotiate reimbursement contracts with the pharmaceutical product provider 106 on behalf of health plan insurers 110. PBMs may also negotiate drug discounts with a pharmaceutical manufacturer 101 and/or wholesaler 102, provide drug utilization reviews and disease management, and in some instances create formularies that encourage or require health plan participants 114 or consumers 108 to use preferred formulary products to treat their conditions.

Continuing with FIG. 1, as discussed above, health plans 110 may include the self-insured health care plans and/or employer funded health plans. The health plans 110 may be administered by health insurance carriers, e.g., Aetna, Blue Cross/Blue Shield, CIGNA, UnitedHealth Care, etc. The health plan 110 may include self-funded and self-administered health plans. The health plans 110 also may include plan participants who may contribute to and fund the health plan.

After filing a claim with the payor 112 for the dispensed product, the payor 112 may in turn request payment from the health plan 110. Upon adjudication of the claim, the payor 112 attempts to make the agreed upon reimbursement for the particular drug distributed to consumer 108 by the retail pharmacy 106.

Figure 2:
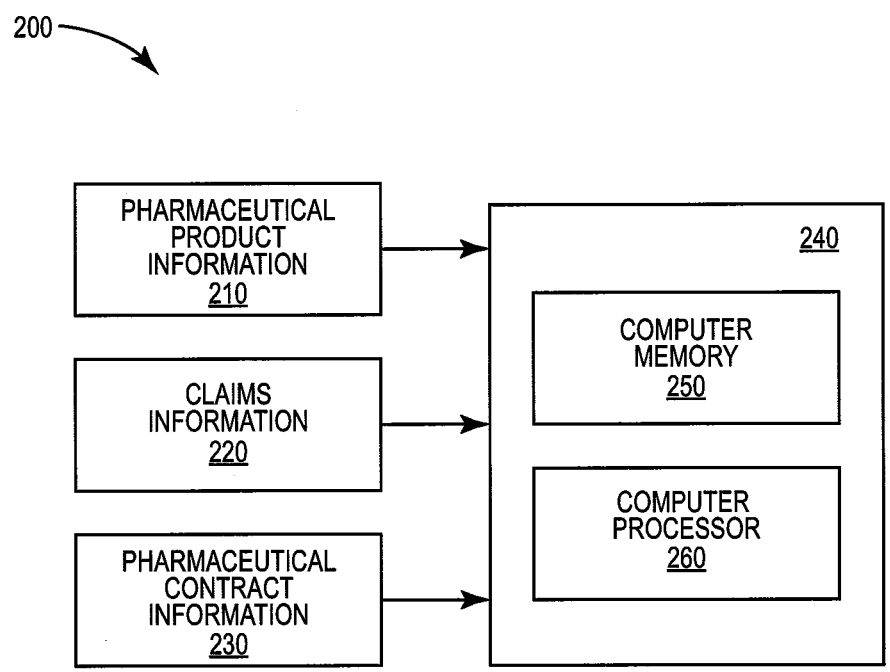
FIG. 2 is a diagram of a computer system for processing pharmaceutical product claims and contract information according to an exemplary embodiment of the present invention.

FIG. 2 is a diagram of an exemplary computer system 200 for associating a pharmaceutical reimbursement contract with a claim according to an embodiment of the present invention. The computer system 200 includes a contract management computer 240 having a memory 250 in electronic communication with a processor 260.

As can be seen in FIG. 2, the contract management computer 240 receives pharmaceutical product information 210 via a communications network (not shown) from one or more product information sources, e.g., First Date Bank (FDB) or Medi-Span (not shown). The product information sources may be one or more pharmaceutical product information computer systems having a database of pharmaceutical product information therein.

Continuing with FIG. 2, the contract management computer 240 may also receive via a communications network claims information 220 regarding a plurality of pharmaceutical product claims from one or more pharmaceutical product provider computer systems (not shown). The contract management computer 240 may also receive pharmaceutical reimbursement contract information 230 regarding a plurality of reimbursement contracts between a payor, i.e., the PBM and/or insurance health plan, and a pharmaceutical product provider. The pharmaceutical claims information and pharmaceutical contract information will be described in more detail below.

Continuing with FIG. 2, the pharmaceutical claims information and pharmaceutical contract information may be stored in the computer memory 250. The computer processor 260 may compare and associate one or more of the pharmaceutical reimbursement contracts with each of the received claims, as will be discussed in more detail below.

Figure 3:
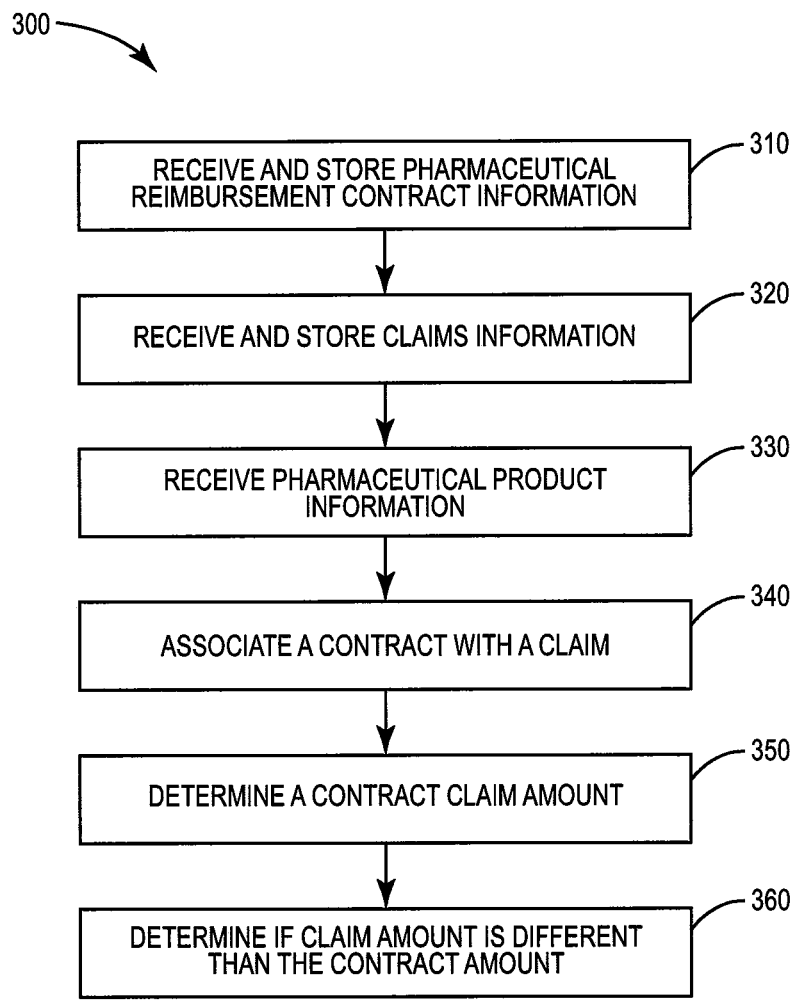
FIG. 3 is a diagram showing a process for associating a pharmaceutical reimbursement contract with a pharmaceutical product claim in an exemplary embodiment of the present invention.

FIG. 3 is a diagram of an exemplary process for associating a pharmaceutical reimbursement contract with a pharmaceutical product claim according to another embodiment of the invention. As can be seen in FIG. 3, in block 310, pharmacy reimbursement contract information is received from a pharmaceutical product provider and is stored in a computer memory on the contract management computer.

Pharmaceutical reimbursement contract ("PRC") information refers to information regarding one or more contracts between a payor, i.e., a PBM, and a pharmaceutical product provider. The PRC information may be used to compare the contracts to, and associate the identified contracts with, a claim for a drug distributed to a consumer. The PRC information may include, but is not limited to, an insurance carrier contract name, an insurance carrier group identifier, contract status indicator, contract type identifier, the contract state identified, retailer store(s) identifier, BIN number or an insurance group payor identifier, health insurance plan code, a contract matching option, a default contract indication, contracted reimbursement rate information, and acceptable rate information. The PRC information is discussed in more detail below. PRC information may be used in the process for comparing and associating a reimbursement contract to a claim, and is further described below.

An insurance carrier contract name refers to a descriptive name assigned to a particular contract and/or group of contracts. The insurance carrier group identifier refers to a group of carriers that may pay for a particular drug, or that may be paid through the same processor. For example, Argus is a carrier who pays for claims submitted for Argus, as well as Humana and Cigna.

A contract status indicator indicates whether a contract is active, inactive or pending. The contract status may be designated "active" when the contract status is ready to be used in the comparing and associating process as discussed below.

A contract type identifier refers to a particular type of contract, e.g., a retail contract, Medicare Part D contract, mail order contract, specialty contract, capitation contract, State/Medicaid contract, Medicaid Part B contract, worker's compensation contract, over-the-counter (OTC) contract, or a preferred or unfunded contract.

A contract state identifier refers to a state or group of states to which a contract pertains. For example, the contract state identifier may refer to a group of states, e.g., North Carolina, South Carolina, and Virginia. Alternatively, contract state identifiers may refer to an indication that the contract is for a specific state, e.g., for North Carolina only. Further, a contract state identifier may indicate that the contract is not specific to a particular state.

A retail store identifier may include an indication that a contract pertains to one or more stores, i.e., physical retail stores of a pharmaceutical product provider. For example, a retail store identifier may indicate that the contract is specific to all stores, a store group or a selected store.

A BIN number is a number associated with a particular carrier group, carrier, or health plan. The BIN number also may refer to an insurance group payor identifier. The contract information may include multiple BIN numbers or one particular BIN number, depending upon the carrier group selected.

A health insurance plan code refers to a code assigned to a particular type of health insurer plan, self-insured plan or employer plan. A plan code may include an indication that the health plan has a "Tier A", "Tier B", or "Tier C", each of which is associated with a different co-pay amount for prescription drugs. In some cases, as will be discussed below, the contract information may include an indication whether or not a particular plan code is considered in the comparing and associating process.

A contract matching option indication refers to an indication if the comparing and associating process includes the plan code matching step as will be described in more detail below. In an embodiment, when the user selects the contract matching option, the comparing and associating process will include a plan code matching step. Alternatively, if the user does not select the contract matching option, the comparing and associating process will not include a plan code matching step.

The contract information may also include an indication of whether the contract is a default contract, which means that a particular contract is the "default contact" for determining a contracted reimbursement rate if no other contract can be identified for a particular claim.

Contract reimbursement rate information refers to the rate that a payor, such as the PBM, pays to the pharmaceutical product provider according to the terms of the pharmaceutical reimbursement contract between them. In an embodiment, a rate is designated in the particular contract that is executed. The contract rates may include the type of rate, the percent off that particular type of rate, plus a fixed dollar amount for a dispensing fee. In an embodiment, the average wholesale price for a particular product may be the default contract rate.

Acceptable rate information refers to a minimum acceptable rate for the contract. The acceptable rate may include more than one rate. In an embodiment, the acceptable information may include an indication that a different acceptable rate may apply for a different day's supply of the drug. For example, one minimum rate may apply to a drug that is being dispensed for only a 30 day supply, and another minimum rate may apply for the same drug that is being dispensed with a 90 day supply.

The pharmaceutical contract information may include additional items of information for processing pharmaceutical product claims. For example, the contract information may also include the carrier address information, co-pay rules, effective date and termination dates of the contracts, transaction fees, billing frequency, billing format, billing addresses, payment methods, tolerance amount, payment terms, remittance, and remittance frequency. In addition, the pharmaceutical contract information may indicate a data source for the pharmaceutical product information. For example, First DataBank, Inc. or Medi-Span, Inc. may be specified as the source of pharmaceutical product information.

Continuing with FIG. 3, as can be seen in block 320, claim information may be received via a communications network from one or more of a plurality of pharmaceutical product providers. The claim information may be stored in a computer memory. The claim information may include, but is not limited to, a claim identifier, a pharmaceutical information identifier, pharmaceutical product claim amount, and pharmaceutical product acquisition costs. Table 1 below shows information included in an exemplary pharmaceutical product claim.

TABLE 1

Claim Information

Claim Identifier
Pharmaceutical Product Identifier
Acquisition Cost
Product Amount
Product Claim Amount
Preferred Drug
Usual & Customary Price
Carrier Maximum Allowable Cost
Refills Remaining
Transmitted Date-Time
Diagnosis Code
Ingredient Cost Submitted As can be seen from Table 1 above, the claims information includes a claim identifier that is a unique identifier for a claim.

A pharmaceutical product identifier refers to a unique identifier for a pharmaceutical product.

Acquisition cost refers to the cost to acquire a pharmaceutical product, which may be a dollar value. The acquisition cost may also be a cost that is determined on a per unit cost, which may be a dollar value. For example, a per unit acquisition cost may refer to the total cost to acquire a particular pharmaceutical product that has been dispensed to a consumer, divided by the total quantity of that product dispensed.

The product claim amount refers to the amount of the claim, which may be a dollar value.

A product amount dispensed refers to the number of pills, milliliters, grams, ounces, etc. dispensed for the claim, which may be a 5-digit number.

A preferred drug identifier may be an indication that the pharmaceutical product is the preferred National Drug Code (NDC) for the pharmaceutical product provider.

A Usual & Customary indicator is the amount charged if the pharmaceutical product is sold as a cash sale, and not billed to a third-party, which may be a dollar value.

A carrier maximum allowable cost (MAC) price refers to the maximum allowable cost that an insurance carrier may use to reimburse a retailer for a particular pharmaceutical product, which may be a dollar value.

Refills remaining refers to the total number of refills available on a prescription, which may be an integer.

Transmitted date-time refers to the date and time when the claim was adjudicated.

Diagnosis code refers to the code used by health plans or PBMs to determine approval of a claim based upon the patient's diagnosed condition or disease. The diagnosis code may be a 5 digit alphanumeric value.

Ingredient cost submitted refers to the cost to submit the original claim, which may be a dollar value.

Continuing with FIG. 3, as can be seen in block 330, the process receives pharmaceutical product information from one or more pharmaceutical product information sources. Pharmaceutical product information may include, but is not limited to, information regarding the price of a pharmaceutical product, and an indication of whether the pharmaceutical product is a branded product or generic product. Table 2 below shows exemplary pharmaceutical product information used in the comparing and associating process described below.

TABLE 2

Pharmaceutical Product Information

GCN Sequence Number
GNN (GCN Description)
Obsolete Date
Pack Size
Current AWP
Current AWP Effective Date
First prior AWP
First prior AWP Effective Date
Second prior AWP
Second prior AWP Effective Date
WAC
DIR
ABP
GI
Innovator Flag
FFPUL ("FUL")
GNI
GMI
NDC Description As can be seen in Table 2 above, the generic code sequence number ("GCN") indicates a group of related drugs where there is more than one manufacturer of the same basic ingredients, i.e., the class of drug, which may be a 6-digit numeric value.

The generic name ("GNN") refers to the name of the generic drug.

The obsolete date refers to the date the drug has been indicated as being obsolete.

Pack size identifies the number of billing units in a package used to dispense the drug, e.g., 100 tablets.

The pharmaceutical product information may include more than one average wholesale price ("AWP"). The current AWP is an average of the wholesaler's list price for drug products to their customers, i.e., the retailers, at the time the product information is transmitted to the contract management computer 240. The current AWP effective date refers to the date on which the AWP is effective. The first prior AWP refers to the AWP that immediately precedes the current AWP. The first prior AWP effective date refers to the effective date of the first prior AWP. The second prior AWP refers to the AWP that precedes the first prior AWP. The second prior AWP effective date refers to the effective date of the second prior AWP.

Pharmaceutical product information may include one or more cost values. As can be seen in Table 2, wholesale acquisition cost ("WAC") is the manufacturer's published catalog or list price for a drug price to wholesalers. The direct price ("DIR") is the manufacturer's list price for a drug product to non-wholesalers. The alternative benchmark price ("ABP") refers to the manufacturer's WAC or DIR.

A generic indicator ("GI") may be used with an innovator flag discussed below to identify whether a drug is a "Generic" or a "Brand." GI also serves as a multi-source or single-source indicator, which may be a "1" or a "2", respectively. A multi-source product is considered a generic if the innovator flag is "0". A single-source product is considered a brand regardless of the innovator flag. The innovator flag refers to whether the product is a "Non-Innovator" or an "Innovator." For example, if GI is 1 and the innovator flag is set to "Innovator," the drug is a generic. All others may be considered a branded drug.

GNI refers to a generic name indicator.

GMI refers to a generic manufacturer indicator.

The NDC description refers to a description of the National Drug Code.

Continuing with FIG. 3, as can be seen in block 340, one or more of the pharmaceutical reimbursement contracts are associated with a claim. The process of associating a contract with a claim may include identifying, via a computer processor, one or more of the plurality of contracts having a first element of pharmaceutical reimbursement contract information that is common to the received claim. If the process indentifies only one such contract, that contract is associated with the received claim. An indication of the association between the identified contract and the received claim is stored in a computer memory. If more than one contract is identified, the process may indentify one or more of the plurality of contracts among the identified contracts that have a second element of pharmaceutical reimbursement contract information that is common to the received claim. Again, if more than one contract is identified, the process may be repeated until only one contract is identified.

Continuing with FIG. 3, as can be seen in block 350, the process determines a contracted claim amount using the contract associated with the claim in block 340. In block 360, the process determines if the claim amount is different than the contracted claim amount. The process may store in a computer memory information about the difference between the amount of the claim and the contracted claim amount. Alternatively, or in addition, the process may transmit an indication of the difference between the claim amount and the contracted claim amount to the pharmaceutical product provider.

Figure 4A:
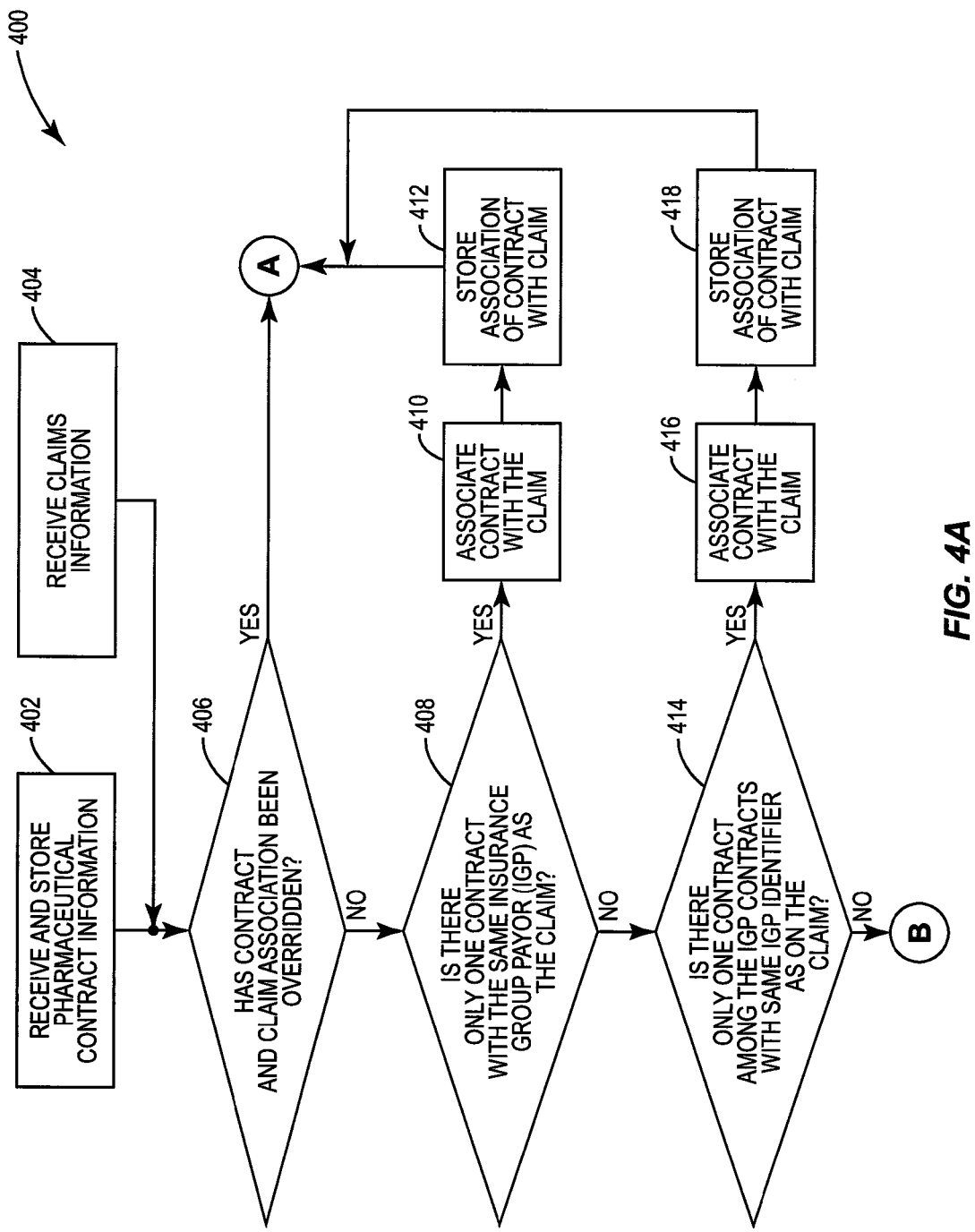
FIGS. 4A through 4C are diagrams showing another process associating a pharmaceutical reimbursement contract with a pharmaceutical product claim according to another exemplary embodiment of the present invention.
Figure 4B:
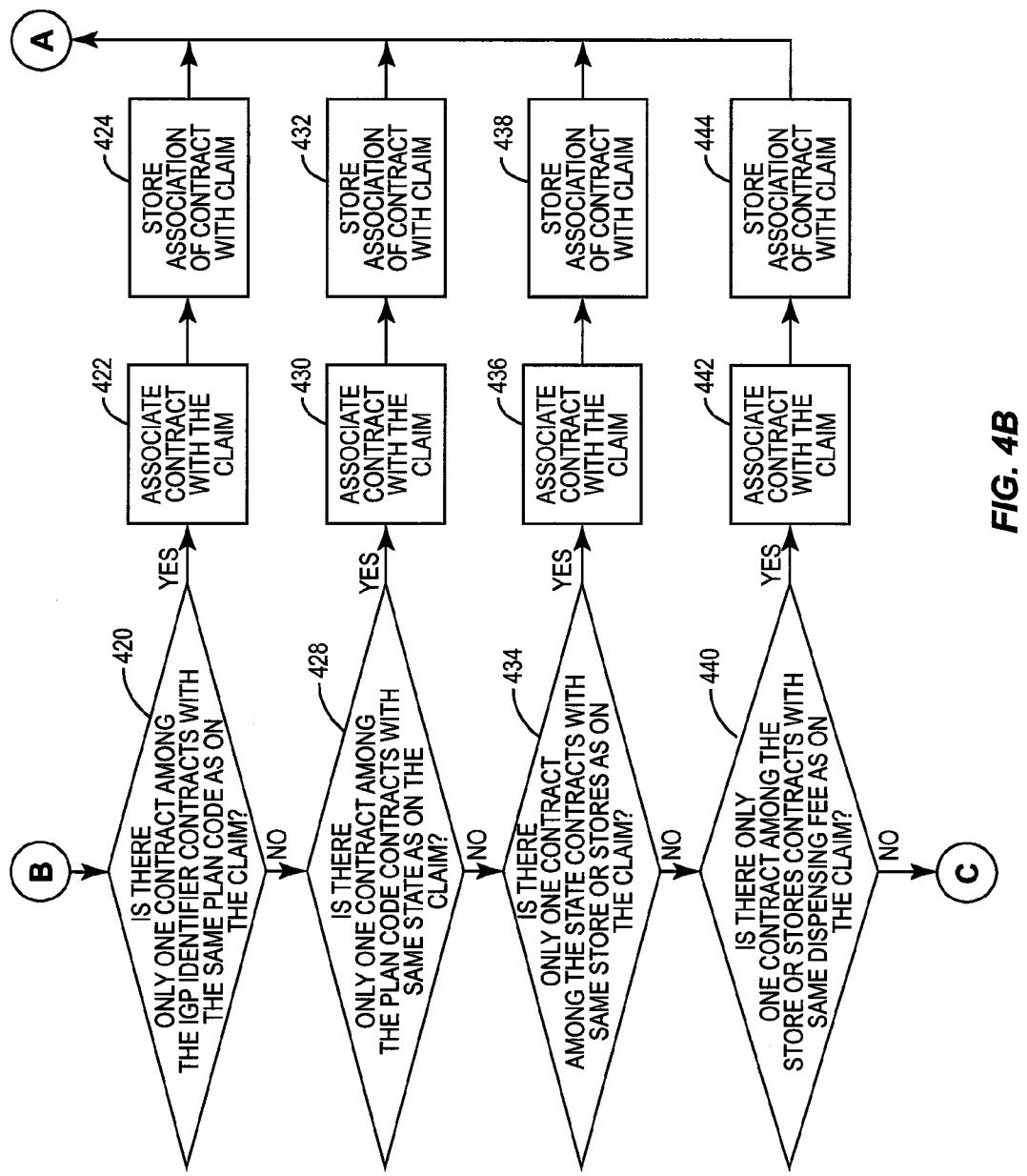
Figure 4C:
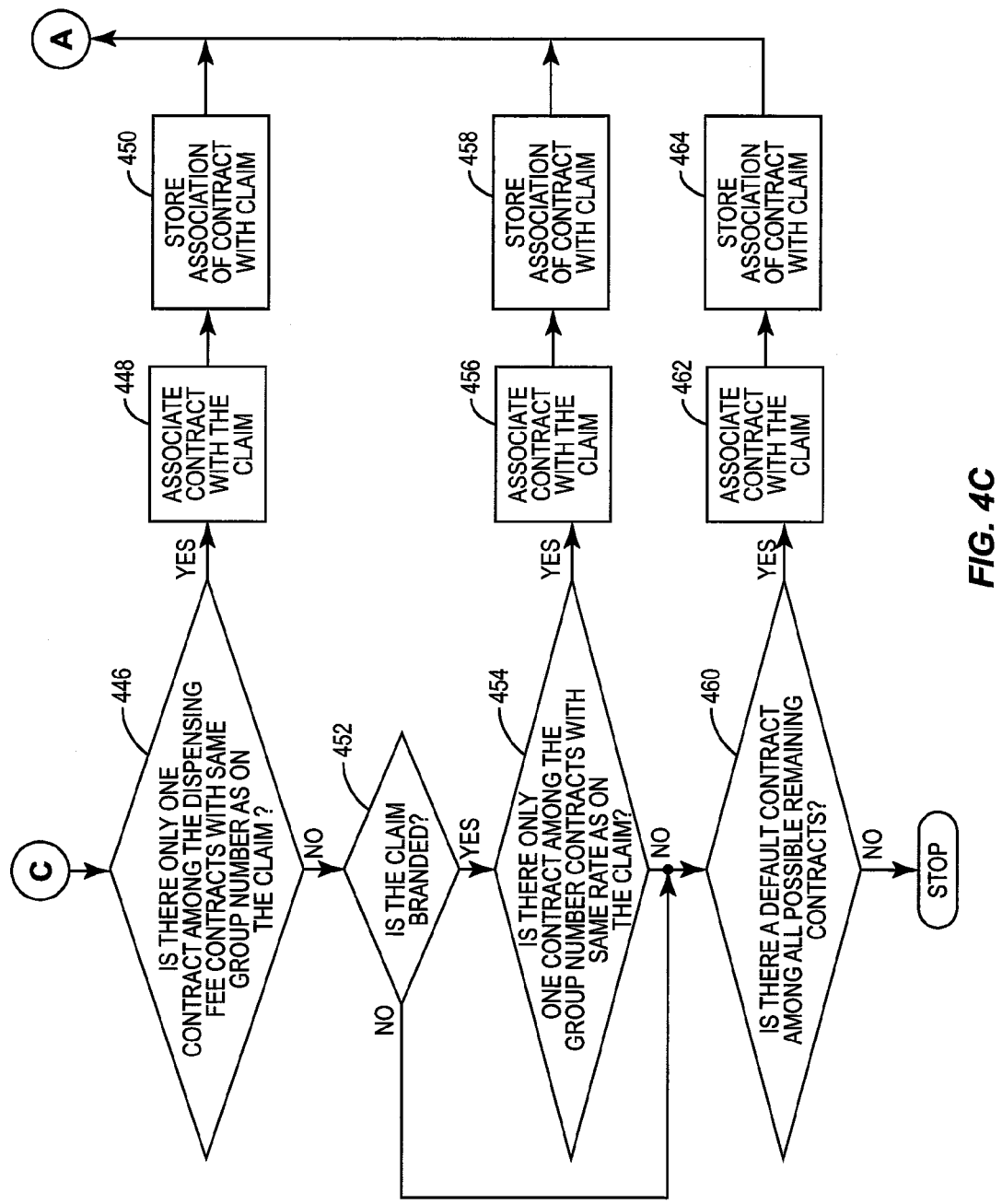

FIGS. 4A-4C are more detailed diagrams of an exemplary method of associating a pharmaceutical product claim with a pharmaceutical reimbursement contract ("PRC"). Referring to FIG. 4A, the process requires that pharmaceutical contract information be received from a pharmaceutical product provider, for example. The PRC information may be transmitted in an electronic format. As can be appreciated, the invention is not limited to a particular way of transmitting the PRC information to a computer. As can be seen in block 402, the contract management computer system receives and stores information regarding the pharmaceutical reimbursement contracts.

Continuing with FIG. 4A, as can be seen in block 404, the process is initiated when pharmaceutical product claim information is received by the contract management computer system. The pharmaceutical product claim information is stored in a computer memory. The receipt and storage of pharmaceutical contract information and claims information may be asynchronous. Processing control is transferred to block 406.

In block 406, the process determines whether the contract and claim association process has been manually overridden by a user. For example, an authorized user may, via a user interface, manually associate a claim with a contract, in which case, the claim will not be subject to the comparing and associating process. If the contract and claim association process has been overridden, processing control is transferred to process 500 illustrated in FIG. 5, which determines whether the claim is eligible for a contract or MAC rate exception. If the process determines that the contract and claim association process has not been overridden, process control is transferred to block 408.

In block 408, the process identifies all of the contracts that have the same insurance group payor ("IGP") as the IGP that is in the claim information. The contracts that have the same IGP as is in the claim information are referred to as "same IGP contracts." If the process determines that there is only one same IGP contract, process control is transferred to block 410. If, in block 408, the process determines that there is more than one same IGP contract, then processing control is transferred to block 414. For example, 1000 contracts may be identified that have the same IGP as is indicated in the claim.

In block 410, the process associates the single identified same IGP contract with the claim and processing control is then transferred to block 412. In block 412, an indication of the association of the claim with the same IGP contract is stored in a computer memory. Processing control is then transferred to process 500 illustrated in FIG. 5, which determines whether the claim is eligible for a contract or MAC rate exception.

Returning to block 414, the process determines whether, among all of the same IGP contracts, there is only one contract with the same IGP identifier (also referred to as the BIN number) as the claim. The same IGP contracts that have the same IGP identifier as the claim are referred to as "same IGP identifier contracts." If the process determines that there is only one same IGP identifier contract, then processing control is transferred to block 416.

In block 416, the process associates the single identified same IGP identifier contract with the claim, and processing control is then transferred to block 418. In block 418, an indication of the association of the claim with the same IGP identifier contract is stored in a computer memory. Processing control is then transferred to process 500 illustrated in FIG. 5, which determines whether the claim is eligible for a contract or MAC rate exception.

Returning to block 414, if the process determines, among all of the same IGP contracts, that there is more than one contract with the same IGP identifier as the claim, processing control is transferred to block 420, which is shown in FIG. 4B. For example, the process may identify 500 contracts with the same IGP identifier as is in the claim.

Turning now to FIG. 4B, as can be seen in block 420, the process identifies, among all of the same IGP identifier contracts, contracts with the same plan code as the claim. The IGP identifier contracts that have the same plan code as the claim are referred to as "same plan code contracts." If there is only one same plan code contract, processing control is transferred to block 422. In block 422, the single identified same plan code contract is associated with the claim. Processing control is transferred to block 424. In block 424, an indication of the association of the claim with the same plan code contract is stored in a computer memory. Processing control is then transferred to process 500 illustrated in FIG. 5, which determines whether the claim is eligible for a contract or MAC rate exception.

Returning to block 420, if more than one same plan code contract is identified, processing control is transferred to block 428.

In an alternate embodiment, all of the identified contracts may have an indication therein that plan code matching is not required. In such an embodiment, processing control from block 414 may be optionally transferred to block 428, which will be discussed in detail below. The identified plan code contracts may include only those contracts that have the matched plan code and those contracts that have been flagged for plan code matching.

Continuing with FIG. 4B, as can be seen in block 428, the process identifies among all the same plan code contracts, the contracts that refer to the same state, e.g. North Carolina, as the state that is identified in the claim. The same plan code contracts that have the same state as the claim are referred to as "same state contracts." In block 428, if the process determines that there is only one same state contract, processing control is transferred to block 430. In block 430, the single identified same state contract is associated with the claim. Processing control is transferred to block 432. In block 432, an indication of the association of the claim with the same state contract is stored in a computer memory. Processing control is then transferred to process 500 illustrated in FIG. 5, which determines whether the claim is eligible for a contract or MAC rate exception.

If, in block 428, the process identifies more than one same state contract, then process control is transferred to block 434. For example, the process may identify between 2 and 200 or more contracts with the same state as is in the claim.

Continuing with FIG. 4B, in block 434 the process determines, among all of the same state contracts, if there is only one same state contract with the same store as is in the claim. The same state contracts that have the same store as the claim are referred to as "same store contracts." In block 434, if the process identifies only one same store contract, then processing control is transferred to block 436. In block 436, the single identified same state contract is associated with the claim. Process control is transferred to block 438. In block 438, an indication of the association of the claim with the same store contract is stored in a computer memory. Processing control is then transferred to process 500 illustrated in FIG. 5, which determines whether the claim is eligible for a contract or MAC rate exception.

Returning to block 434, if the process identifies more than one same store contract, process control is transferred to block 440.

In block 440, the process determines if one or more of the same store contracts has the same dispensing fee as the dispensing fee that is indicated in the claim. The same store contracts that have the same dispensing fee as the claim are referred to as "same dispensing fee contracts." If the process determines that there is only one same dispensing fee contract, process control is transferred to block 442.

In block 442, the single identified same dispensing fee contract is associated with the claim. Process control is transferred to block 444. In block 444, an indication of the association of the claim with the same dispensing fee contract is stored in a computer memory. Processing control is then transferred to process 500 illustrated in FIG. 5, which determines whether the claim is eligible for a contract or MAC rate exception.

Returning to block 440, if the process determines there are more than one same dispensing fee contract, process control is transferred to block 446 shown in FIG. 4C. For example, the process may identify between 2 and 100 or more contracts with the same dispensing fee as in the claim contract.

Referring now to FIG. 4C, as can be seen in block 446, the process determines, among the same dispensing fee contracts, if there is one or more contracts with the same group number as is the group number in the claim. The same dispensing fee contracts that have the same group number as the claim are referred to as "same group number contracts." If there is only one same group number contract, process control is transferred to block 448. In block 448, the single identified same group number contract is associated with the claim. Process control is transferred to block 450. In block 450, an indication of the association of claim with the same group number contract is stored in a computer memory. Processing control is then transferred to process 500 illustrated in FIG. 5, which determines whether the claim is eligible for a contract or MAC rate exception.

Returning to block 446, if the process indentifies more than one same group number contract, process control is transferred to block 452. In block 452, the process determines if the claim concerns a branded pharmaceutical product, i.e., the pharmaceutical is not a generic product. If the claim concerns a branded pharmaceutical product, process control is transferred to block 454, as will be discussed below. If, in block 452, the process determines that the claim does not concern a branded pharmaceutical product, i.e., the claim is for a generic pharmaceutical product, process control is transferred to block 460, which will be described below. In an embodiment, if the claim is paid at the Usual & Customary ("U & C") rate, the rate comparing process in block 454 may be skipped because there typically will not be a rate match made on claims paid at the U & C rate. Typically a carrier may reimburse claims based on the lowest of MAC, U&C, and the contracted rate. If the pharmacy's U&C rate submitted on the claim is lower than the MAC or the contracted rate, the carrier may reimburse the pharmacy based on their U&C rate. In another embodiment, if the claim concerns a generic product that has a federal upper limit ("FUL"), the rate comparing process in block 454 may be skipped. In another embodiment, if the claim concerns a generic product, and the product is an OTC drug, the rate comparing process in block 454 may be skipped. In yet another embodiment, if the claim concerns a generic product, but the pharmaceutical product information includes an indication that the FUL field is '0' or 'NULL', the claim will be processed via the rate comparing process in block 454.

In block 454, the process determines, among the same group number contracts, if there is only one contract with the same reimbursement rate as the reimbursement rate that is indicated in the claim. The same group number contracts that have the same payment rate as the claim are referred to as "same payment rate contracts."

As used herein, the payment rate refers to the pharmaceutical products providers' ingredient revenue ("IR"). The IR is calculated according to the following relation:

$$IR=C+A-DF,$$

where C is co-pay, A is the A/R Amount, which is the amount of the claim submitted to the carrier for reimbursement, and D is the Dispensing Fee.

If there is only one same payment rate contract, process control is transferred to block 456. In block 456, the process associates the single identified same payment rate contract with the claim and process control is transferred to block 458. In block 458, an indication of the association of the claim with the same payment rate contract is stored in a computer memory. Processing control is then transferred to process 500 illustrated in FIG. 5, which determines whether the claim is eligible for a contract or MAC rate exception.

Returning to block 454, if the process determines that there is more than one same payment rate contract, process control is transferred to block 460.

In block 460, the process determines, among all the same payment rate contracts, if there is a default contract that can be associated with the claim. A default contract is a contract that is associated with a claim, if there is more than one same payment rate contract. If there is a default contract, process control is transferred to block 462. In block 462, the identified default contract is associated with the claim. Process control is transferred to block 464. In block 464, an indication of the association of the claim with the default contract is stored in a computer memory. Processing control is then transferred to process 500 illustrated in FIG. 5, which determines whether the claim is eligible for a contract or MAC rate exception.

Figure 5:
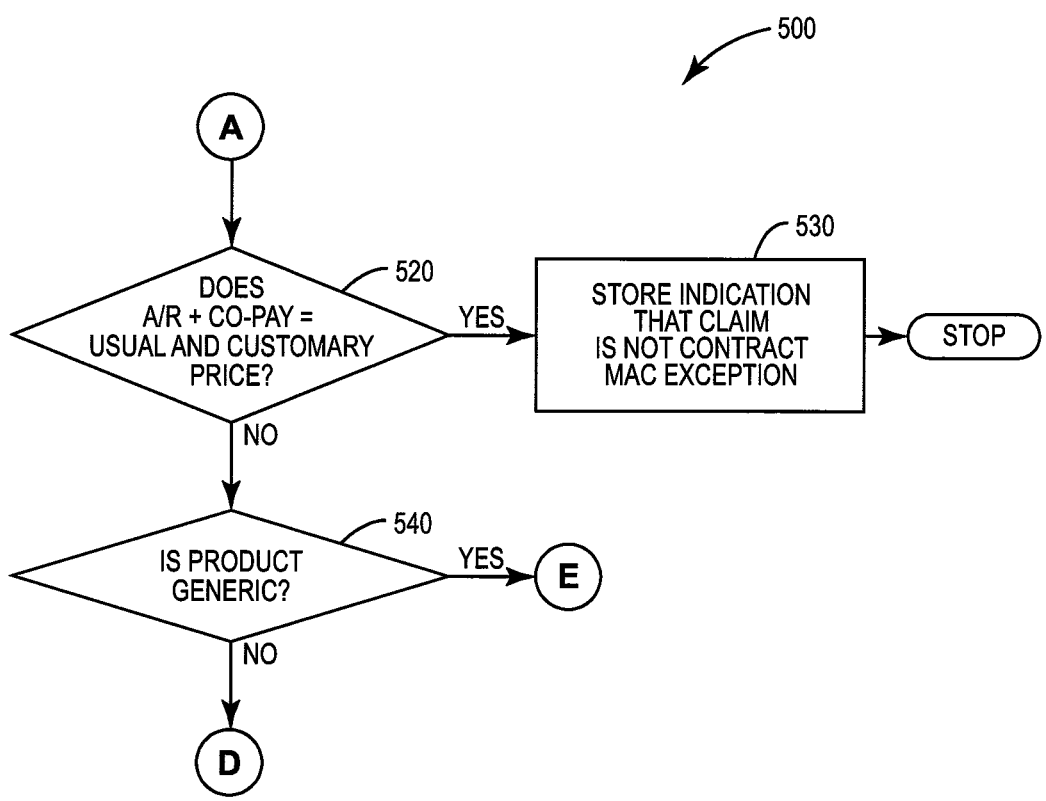
FIG. 5 is a diagram showing a process for determining if a pharmaceutical product claim that has been associated with a pharmaceutical reimbursement contract is eligible for a maximum allowable cost exception or a contract exception according to an exemplary embodiment of the present invention.

FIG. 5 is a diagram of an exemplary method of determining if a claim that has been associated with a contract is eligible for a contract exception or MAC rate exception. In block 520, the process determines if the sum of the claim amount (or the A/R amount) plus the received co-pay is equal to the U & C price. If this value is equal to the U & C price, the claim is not eligible for a contract exception or MAC rate exception. Process control is transferred to block 530. In block 530, an indication that the claim is not eligible for a contract exception or MAC rate exception is stored in a computer memory. Processing then stops.

Returning to block 520, if the process determines that the claim amount plus the co-pay is not equal to the U & C price, processing control is transferred to block 540.

Figure 6:
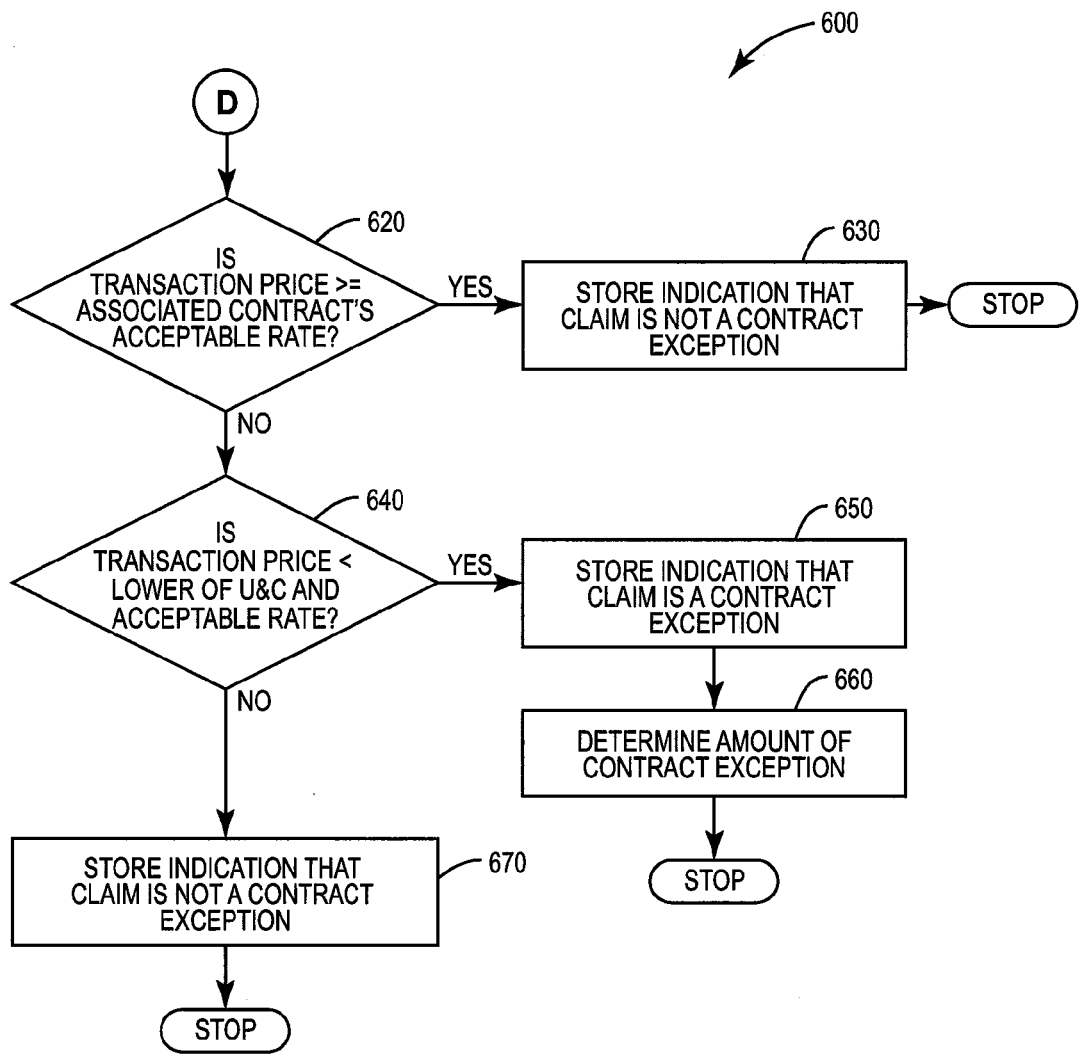
FIG. 6 is a diagram showing the process for determining the amount of a contract exception for a pharmaceutical product claim that has been associated with a pharmaceutical contract in an exemplary embodiment of the present invention.
Figure 7:
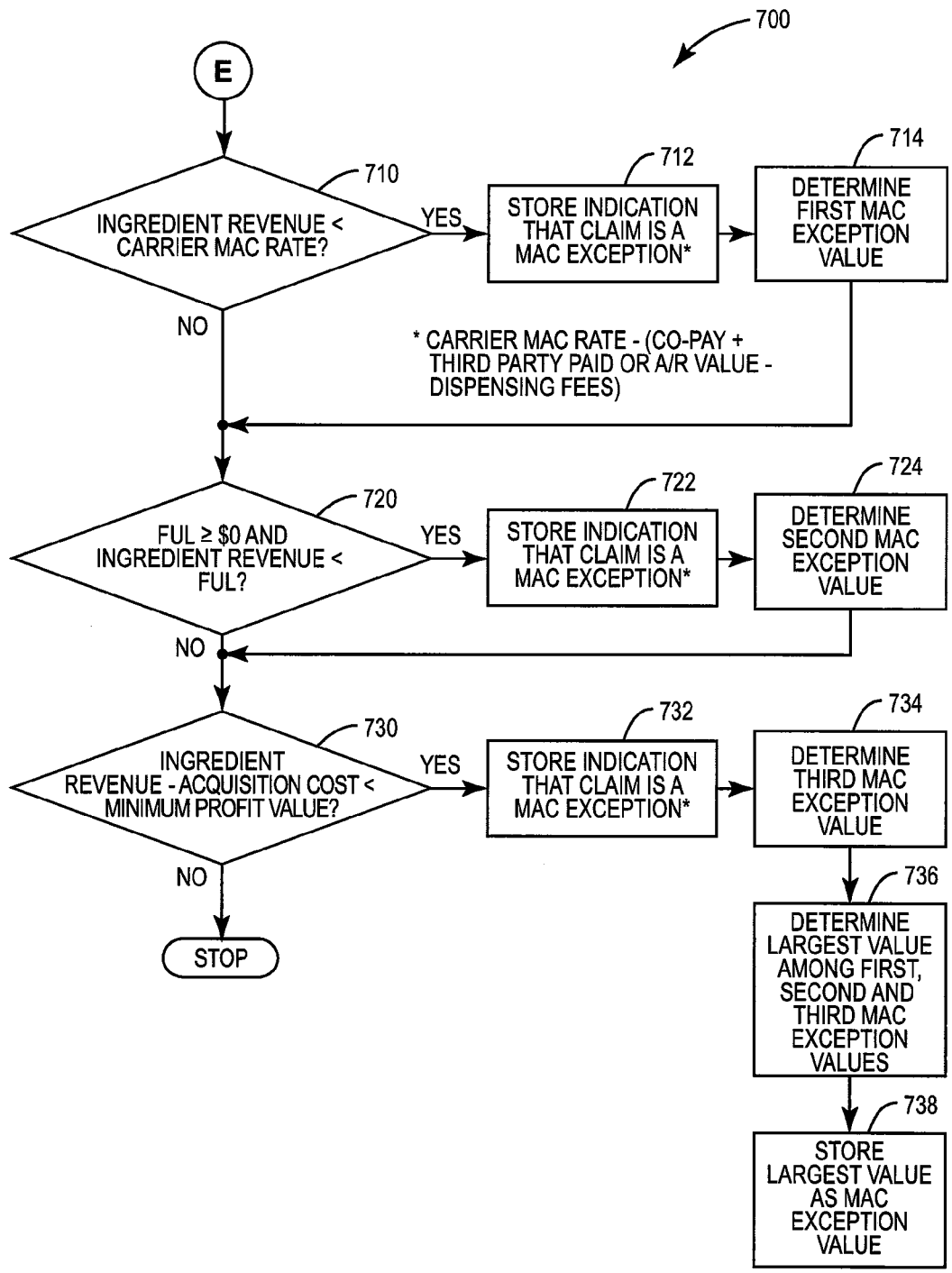
FIG. 7 is a diagram showing the process for determining the amount of a maximum allowable cost exception for a pharmaceutical product claim that has been associated with a pharmaceutical contract in an exemplary embodiment of the present invention.

In block 540, the process determines if the claim concerns a generic product. If, in block 540, the process determines that the claim does not concern a generic product, processing control is transferred to block 620, which is shown in FIG. 6 and discussed below. If the process determines that the claim concerns a generic product, then process control is transferred to block 710, which is shown in FIG. 7 and which will be discussed below.

FIG. 6 is a diagram showing an exemplary method for determining if a claim that has been associated with a contract is subject to a contract exception. As can be seen in block 620, the process determines if the transaction price is greater than or equal to the associated contract's acceptable rate. The transaction price refers to the claim amount (A/R) plus the co-pay. If the process determines that the transaction price is greater than or equal to the identified contract's acceptable rate, the claim is not subject to a contract exception. Process control is transferred to block 630.

In block 630, the process stores an indication that the claim is not subject to a contract exception, and processing stops.

Returning now to block 620, if the process determines that the transaction price is not greater than or equal to the identified contract's acceptable rate, then process control is transferred to block 640.

In block 640, the process determines if the transaction price is less than the lesser of either the U & C and the contract acceptable rate. If the transaction price is less than the lesser of the U & C price and the contract acceptable rate, the claim is identified as being subject to a contract exception. Process control is transferred to block 650. In block 650, an indication that the claim is subject to a contract exception is stored in the computer memory. Process control is then transferred to block 660.

In block 660, the process determines the difference between the contracted amount and the claim amount. An indication of the difference between the contracted amount and claim amount may be stored in the computer memory (not shown). In other embodiments, the indication may be made accessible to a pharmaceutical product provider computer system. Processing then stops.

Returning to block 640, if the process determines that the transaction price is greater than the lesser of the U & C price and the acceptable rate of the associated contract, the claim is identified as not being subject to a contract exception. Process control is transferred to block 670. In block 670, an indication that the claim in not subject to a contract exception is stored in the computer memory. Processing then stops.

Turning now to FIG. 7, a process 700 for determining whether a claim, which has been associated with a contract, is subject to a maximum allowable cost ("MAC") exception is shown. A claim may be subject to a MAC exception if it is determined that a retailer is seeking reimbursement for more than an acceptable rate. In an embodiment, however, if the claim information does not include a National Drug Code ("NDC") value, the claim will not undergo MAC exception processing.

As can be seen from FIG. 7, in block 710, the process determines if the ingredient revenue ("IR") is less than the carrier MAC rate. The carrier MAC rate is the maximum allowable cost that an insurance carrier may use to reimburse a retailer for a particular pharmaceutical product.

As described above, the IR is the co-pay plus the claim amount for the pharmaceutical product, less the dispensing fees. If the IR is less than the carrier MAC rate, the claim is subject to a MAC exception. Process control is transferred to block 712.

In block 712 an indication that the claim is subject to a MAC exception is stored in a computer memory. Process control is transferred to block 714. In block 714 the process determines a first MAC exception amount. The first MAC exception amount is the carrier MAC rate less the IR. An indication of the first MAC exception amount may be stored in a computer memory. Process control is transferred to block 720.

In block 720, the process determines if the federal upper limit ("FUL") is greater than or equal to zero, and whether the IR is less than the FUL. If both of these conditions are met, the claim is subject to a MAC exception. Process control is transferred to 722. In block 722, an indication that the claim is subject to a MAC exception is stored in a computer memory. Process control is transferred to block 724.

In block 724, the process determines a second MAC exception amount. The second MAC exception amount is the FUL less the IR. An indication of the second MAC exception amount may be stored in a computer memory. Process control is transferred to block 730.

In block 730, the process determines if the IR less acquisition costs for obtaining the pharmaceutical product is less than a predetermined minimum profit target. If the determined value is less than the minimum profit target, the claim is subject to a MAC exception. Process control is transferred to block 732. In block 732, an indication that the claim is subject to a MAC exception is stored in the computer memory. Processing control is then transferred to block 734. In block 734, the process determines the value of a third MAC exception amount. The third MAC exception amount is the minimum profit less the IR. An indication of the third MAC exception amount may be stored in a computer memory. Processing control is transferred to block 736.

In block 736, the process may determine the largest value among the first, second and third MAC exception amounts. Processing control is then transferred to block 738. In block 738, an indication of the largest MAC exception amount may be stored in a computer memory. Processing then stops.

Returning to block 730, if the IR less the acquisition costs is greater than the minimum profit value, the claim is not subject to a MAC exception. Processing then stops.

Figure 8:
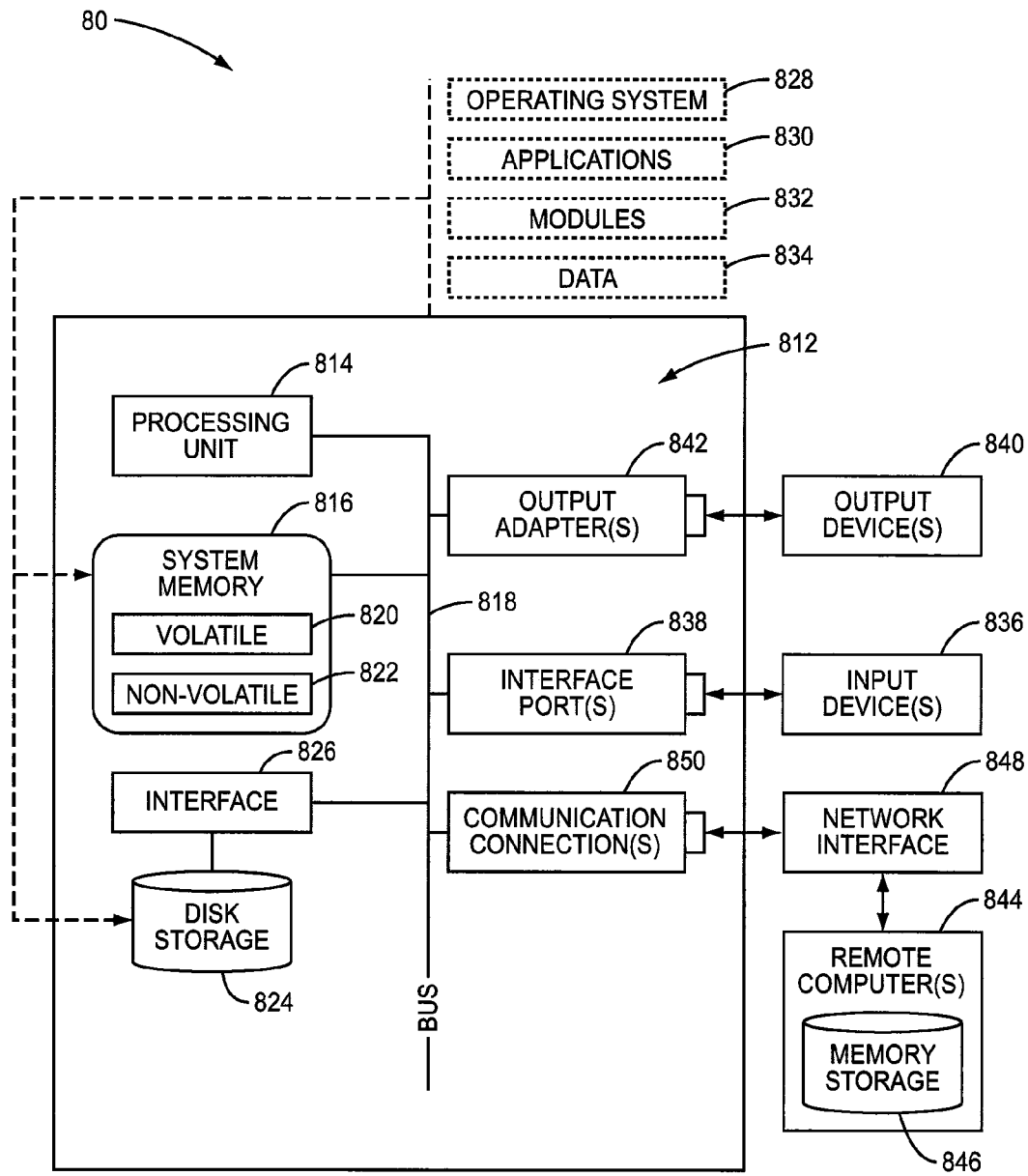
FIG. 8 is a diagram illustrating exemplary computer hardware and software to implement an embodiment of the invention.

FIG. 8 illustrates exemplary hardware and software components that may be used to implement an embodiment of the present invention. While aspects of the invention may be described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that can perform particular tasks or implement particular data types. The operating environment 80 is an exemplary suitable operating environment and does not limit the scope of the invention. Other known computer systems, environments, and/or configurations may be suitable for use with the invention.

Referring to FIG. 8, an exemplary environment 80 for implementing various aspects of the invention includes a computer 812, which includes a processing unit 814, a system memory 816, and a system bus 818. The system bus 818 couples the system components including, the system memory 816 to the processing unit 814. The processing unit 814 can be any of various processors available. The system bus 818 can be any of the available types of bus structures using any variety of available bus architectures. The system memory 816 includes volatile memory 820 and nonvolatile memory 822.

Computer 812 also may include removable/nonremovable, volatile/nonvolatile computer storage media, for example, a disk storage 824. Disk storage devices 824 may be connected to the system bus 818 via removable or non-removable interface 826.

FIG. 8 also illustrates software that allows interaction between users and computer resources, which may include an operating system 828. System applications 830 are allocated resources by operating system 828 through program modules 832 and program data 834 stored either in system memory 816 or on disk storage 824. Aspects of the present invention may be implemented with various operating systems or combinations of operating systems.

A user enters commands or information into computer 812 through input devices 836, which connect to processing unit 814 through the system bus 818 via interface ports 838. Input devices may include tables, touch screens, keyboards, scanners, etc., which can be used to input data. Output devices 840 use some of the same type of ports as input devices 836. Output adapter 842 may be provided because some output devices 840 like monitors, speakers and printers require special adapters. Other devices and/or systems of devices provide both input and output capabilities such as remote computers 844.

Computer 812 can operate in a networked environment using logical connections to one or more remote computers, such as remote computers 844. The remote computers 844 can be a personal computer, a server, a router, a network PC, a workstation, a microprocessor based appliance, a peer device or other common network node, which may include many or all of the elements of computer 812. While only a single memory storage device 846 is shown, remote computers 844 may be logically connected to computer 812 through a network interface 848 and physically connected via communication connection 850.

Although the present invention has been described with exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

We claim:

1. A computer implemented method for determining compliance with contracted pharmacy reimbursement rates, comprising:

storing in a computer memory pharmacy reimbursement contract information, the pharmacy reimbursement contract information being comprised of information regarding a plurality of contracts between a payor and a pharmaceutical product provider ("PPP");

receiving, via an electronic communications network, and storing in a computer memory a plurality of claims, each claim being comprised of claim information;

comparing, via a computer processor, one or more of the plurality of received claims with at least one of the plurality of contracts by:

identifying, via a computer processor, one or more of the plurality of contracts having pharmaceutical reimbursement contract information that is common with one or more of the received claims; if only one contract is identified, then associating the one contract with one or more of the received claims;

storing in the computer memory an indication of the association of the one identified contract with one or more of the received claims;

receiving, via the electronic communications network, pharmaceutical product information including a price of the pharmaceutical product;

determining, by the computer processor, for each of the received claims and associated contract, a contracted claim amount, wherein the contracted claim amount is determined according to the terms of the contract and the pharmaceutical product information;

determining, by the computer processor, whether the claim amount is different than the contracted claim amount;

determining, by the computer processor, for each of the received claims and associated contract, if the received claim is a maximum allowable cost (MAC) exception;
  a. if the claim is a MAC exception, determining the MAC exception value, the MAC exception value being the greater of the difference between:
    i. the MAC rate for the received claim and the pharmaceutical product revenue;
    ii. the federal upper limit (FUL) for the pharmaceutical product and the pharmaceutical product revenue; and
    iii. the actual profit for the claim and a predetermined minimum value, the actual profit being the difference between the pharmaceutical product revenue and the pharmaceutical product acquisition cost; and
  b. storing in a computer memory an indication of the MAC exception value of the received claim and associated contract
transmitting an indication of the difference between the claim amount and the contracted claim amount to the pharmaceutical product provider.

2. The method of claim 1, wherein the step of comparing further comprises: if more than one contract is identified, indentifying, via computer processor, one or more of the plurality of contracts among the identified contracts that have pharmaceutical reimbursement contract information that is common with one or more of the received claims.

3. The method of claim 1, wherein the step of comparing further comprises:
  if more than one contract is identified, repeating the identifying step until only one contract is identified.

4. The method of claim 1,
  wherein the pharmaceutical product information further comprises an indication of whether the pharmaceutical product is branded or generic.

5. The method of claim 1, further comprising:
  storing in the computer memory the indication of the difference between the claim amount and the contracted claim amount.

6. The computer implemented method of claim 5, further comprising:
  providing access to the indication of the difference between the claim amount and the contracted claim amount to the pharmaceutical product provider.

7. The method of claim 1, wherein pharmacy reimbursement contract information comprises an insurance group payor identifier, insurance payor identifier, contract status, the type of contract, contract state, store identifier, insurance payor plan code, contract rate, dispensing fee, and acceptable contract rates.

8. The computer implemented method of claim 1, further comprising:
  if the claim is a contract exception, determining, via a computer processor, the contract exception value, the contract exception value being the difference between the actual amount of money received for the pharmaceutical product and acceptable rates of the matched contract; and
  storing in a computer memory an indication of the contract exception value of the at least one associated claim and identified contract.

9. The computer implemented method of claim 1 wherein the claim information comprises a claim identifier, a pharmaceutical product identifier, a pharmaceutical product amount and a pharmaceutical product claim amount.

10. A computer system for determining compliance with contracted pharmacy reimbursement rates, the system comprising:
  a computer memory for storing pharmacy reimbursement contract information, the pharmacy reimbursement contract information being comprised of information regarding a plurality of contracts between a payor and a pharmaceutical product provider ("PPP");
  a computer processor, electronically coupled to the computer memory, for receiving, via an electronic communications network, and storing in the computer memory a plurality of claims, each claim being comprised of claim information;
  comparing one or more of the plurality of received claims with at least one of the plurality of contracts by:
    identifying, via the computer processor, one or more of the plurality of contracts having pharmaceutical reimbursement contract information that is common with one or more of the received claims; and if only one contract is identified, then associating the one contract with one or more of the received claims; and
  storing in the computer memory an indication of the association of the one identified contract with one or more of the received claims;
  receiving, via the electronic communications network, pharmaceutical product information including a price of the pharmaceutical product;
  determining, by the computer processor, for each of the received claims and associated contract, a contracted claim amount, wherein the contracted claim amount is determined according to the terms of the contract and the pharmaceutical product information;
  determining, by the computer processor, whether the claim amount is different than the contracted claim amount;
  determining, by the computer processor, for each of the received claims and associated contract, if the received claim is a maximum allowable cost (MAC) exception; and
    a. if the claim is a MAC exception, determining the MAC exception value, the MAC exception value being the greater of the difference between:
      i. the MAC rate for the received claim and the pharmaceutical product revenue;
      ii. the federal upper limit (FUL) for the pharmaceutical product and the pharmaceutical product revenue; and
      iii. the actual profit for the claim and a predetermined minimum value, the actual profit being the difference between the pharmaceutical product revenue and the pharmaceutical product acquisition cost; and
    b. storing in a computer memory an indication of the MAC exception value of the received claim and associated contract
  transmitting an indication of the difference between the claim amount and the contracted claim amount to the pharmaceutical product provider.

11. A computer program product comprising software for determining compliance with contracted pharmacy reimbursement rates, the computer program product being comprised of a non-transitory computer readable medium having stored thereon instructions, which when loaded into a computer memory and executed by a processor, causes the processor to:

store pharmacy reimbursement contract information in the computer memory, the pharmacy reimbursement contract information being comprised of information regarding a plurality of contracts between a payor and a pharmaceutical product provider ("PPP");

receive, via an electronic communications network, and store in the computer memory a plurality of claims, each claim being comprised of claim information;

compare one or more of the plurality of received claims with at least one of the plurality of contracts by:

identifying one or more of the plurality of contracts having pharmaceutical reimbursement contract information that is common with one or more of the received claims; and if only one contract is identified, then associating the one contract with one or more of the received claims; and storing in the computer memory an indication of the association of the one identified contract with one or more of the received claims;

receiving, via the electronic communications network, pharmaceutical product information including a price of the pharmaceutical product;

determining, for each of the received claims and associated contract, a contracted claim amount, wherein the contracted claim amount is determined according to the terms of the contract and the pharmaceutical product information;

determining whether the claim amount is different than the contracted claim amount;

determining for each of the received claims and associated contract, if the received claim is a maximum allowable cost (MAC) exception; and a. if the claim is a MAC exception, determining the MAC exception value, the MAC exception value being the greater of the difference between:

i. the MAC rate for the received claim and the pharmaceutical product revenue;

ii. the federal upper limit (FUL) for the pharmaceutical product and the pharmaceutical product revenue; and iii. the actual profit for the claim and a predetermined minimum value, the actual profit being the difference between the pharmaceutical product revenue and the pharmaceutical product acquisition cost; and b. storing in computer memory an indication of the MAC exception value of the received claim and associated contract transmit an indication of the difference between the claim amount and the contracted claim amount to the pharmaceutical product provider.

12. The computer program product of claim 11, which when executed by a processor, causes the processor to:

determine if more than one contract is identified, to further indentify one or more of the plurality of contracts among the identified contracts that have pharmaceutical reimbursement contract information that is common with one or more of the received claims.

13. The computer program product of claim 11, which when executed by a processor, causes the processor, when more than one contract is identified, to repeat the identifying step until only one contract is identified.

14. The computer program product of claim 11, wherein the pharmaceutical product information further comprises an indication of whether the pharmaceutical product is branded or generic.

15. The computer program product 11, which when executed by a processor, causes the processor to store in computer memory the indication of the difference between the claim amount and the contracted claim amount.

16. The computer program product of claim 11, which when executed by a processor, causes the processor to provide access to the indication of the difference between the claim amount and the contracted claim amount to the pharmaceutical product provider.

* * * * *